United States Patent [19]

Bögert et al.

[11] Patent Number: 5,188,653
[45] Date of Patent: Feb. 23, 1993

[54] APPARATUS FOR SEVERING GOBS FROM GLASS STREAMS

[75] Inventors: Hermann Bögert, Auetal; Hans-Georg Seidel, Rinteln, both of Fed. Rep. of Germany

[73] Assignee: Hermann Heye, Obernkirchen, Fed. Rep. of Germany

[21] Appl. No.: 762,447

[22] Filed: Sep. 19, 1991

[30] Foreign Application Priority Data

Oct. 22, 1990 [DE] Fed. Rep. of Germany ....... 4033381

[51] Int. Cl.⁵ .............................................. C03B 7/10
[52] U.S. Cl. ........................................ 65/334; 65/332; 83/602; 83/603
[58] Field of Search ..................... 65/334, 332; 83/603, 83/602, 623, 601

[56] References Cited

U.S. PATENT DOCUMENTS

| | | | |
|---|---|---|---|
| 2,401,994 | 6/1946 | Weber | 65/334 |
| 2,472,560 | 6/1949 | Avery | 83/603 |
| 2,812,619 | 11/1957 | Wythe | 65/334 |
| 4,388,100 | 6/1983 | Marroquin | 65/334 |
| 4,467,683 | 8/1984 | Newkirk | 83/623 |
| 4,544,397 | 10/1985 | Fenton | 65/334 |
| 4,728,354 | 3/1988 | Vilk | 65/334 |

OTHER PUBLICATIONS

Merriam-Webster Webster's Ninth New Collegiate Dictonary, 1990, p. 1076.

*Primary Examiner*—Joye L. Woodard
*Attorney, Agent, or Firm*—Ferrill, Logan, Johns & Blasko

[57] ABSTRACT

Each glass gob is severed by a shear blade pair (6; 9). The shear blades (7, 8; 10, 11) are arranged on shear arms (12, 13) whose movement is synchronized with each other by means of a gear mechanism (16) A first shear arm (12) is drivable pivotably by a drive means (36), while a second shear arm (13) is supported by an air spring (28). The drive means (36) is carried on a carriage (39) which is displaceable by piston-cylinder units (48, 49). The drive means (36) drives a crank pin (43) which is connected by means of a coupling rod (44) with the first shear arm (12). By displacement of the carriage (39) one achieves a servicing stroke (34) which is greater than the working stroke (32) of the shears.

8 Claims, 2 Drawing Sheets

APPARATUS FOR SEVERING GOBS FROM GLASS STREAMS

BACKGROUND OF THE INVENTION

1. Field of the Invention

This invention relates to apparatus for severing gobs from one or more streams of molten glass, in which the separation of each gob is effected by a pair of shear blades, wherein the shear blades of the pair or each shear blade pair are arranged on respective associated, pivotally mounted shear arms, and wherein the pivotal movement of the two shear arms is synchronized by means of a gear mechanism with the pivotal movements being produced by the driving of one of the shear arms by a drive means.

2. Description of the Prior Art

In one known apparatus of this type, German Auslegeschrift 28 18 234 B1, the electrical drive 1 rotationally drives a cam plate 2 having an arcuate groove 13. In the arcuate groove 13 runs a roller 3 of a lever 4 which is secured to the pivot shaft of one arm 5 of the shear arms 5, 8. The arcuate groove 13 is so formed that the shear arms 5, 8 maintain the most favorable speed for the individual sections of a working cycle corresponding to a working sector (360°-α) and are stationary when traversing a dead period sector α. In the dead period sector α the cam plate 2 is either arrested or rotated more slowly for the purpose of the temporal positioning. Being tied to the course of the arcuate groove in the working sector is disadvantageous since it is expensive and not very flexible. The switching off or slowing down of the speed of rotation of the drive in the dead period sector α means additional expense.

From U.S. Pat. No. 3,736,826 it is known to drive a crank arm 38 by a hydraulic rotary drive 50, and by means of a gearwheel pair 46, 48 to drive a further crank arm 40 in the opposite sense. Eccentric pins on the crank arms 38, 40 drive respective coupling rods 34, 36 which are linked respectively to one of the shear arms 28, 30. This apparatus is expensive to construct and difficult to control from a technical point of view.

From German Auslegeschrift 1,922,247 it is known to provide mounting brackets 32, 52 which can be adjusted in the circumferential direction of a feeder spout 12.

In another known apparatus, U.S. Pat. No. 2,472,560, a pneumatic-mechanical drive for the shear arms 1, 2 is used. The one shear arm 2 is connected by means of a coupling rod 14 to a pivot lever 12 with a cam roller 11. The cam roller 11 runs on a rotating cam track 10a, 10b on which is coaxially arranged a further rotating cam track 50 for the actuation of a pneumatic control valve 36. The control valve 36 powers, by means of a conduit 51, 52, a chamber 17b of a piston-cylinder unit 17 with compressed air, with the piston rod 18 of the unit being coupled to the other shear arm 1. Thus, the force for the closing of the shear blades 7, 8 is generated by the piston-cylinder unit 17, and the course of the closure movement is controlled mechanically by the cam track 10b. In addition to this, the piston-cylinder unit 17 always keeps the cam roller 11 in contact with the cam track 10a, 10b. However, this known apparatus is expensive and fairly inflexible. With relatively high cutting rates of, for example, up to about 200 cuts per minute, the known drive is overloaded. Moreover, the working stroke of the shear arms is the same as its servicing stroke for the exchange of the drop ring, and is therefore undesirably large.

From U.S. Pat. No. 2,977,718 there is known an apparatus which uses a pneumatic-hydraulic drive. This requires high circuit expenditure and is likewise not suitable for the higher cutting speeds.

In another known apparatus, U.S. Pat. No. 2,678,519, each of the two shear arms 1, 2 is separately driven in the same manner, and indeed by means of a coupling rod 16, 17, a crank pin 18, 19 with crank 20, 21 and crank shaft 22, 23, a pinion 28, 29 and a gear rack 30, 31, which are displaceable by pistons 33, 34 of pneumatic cylinders 10, 27. The control of the pneumatic cylinders 10, 27 is effected by means of cams 109, 137, 138 and a number of valves of a pneumatic circuit. Here again, the expense is considerable and the flexibility is small.

From British Patent 688,803 there is known an apparatus in which both shear arms 1, 2 are drivable respectively by means of a toggle link 10, 11 through the piston rod 12, 13 of a common double-acting pneumatic cylinder 14. By this means the configuration of the movement of the shear arms cannot be reproduced. The length of the shear arms must be adapted to the stroke of the cylinder 14. It is not possible to center the shear arms 1, 2 in relation to the axis of the drop ring.

It is an object of the invention to improve the apparatus of the type first referred to above.

This is achieved in accordance with the invention in that a crank having an eccentric crank pin is driven by said drive means, a coupling rod is coupled on the one hand to the crank pin and on the other hand to said one shear arm, the drive means is arranged on a carriage, and the carriage is displaceable substantially transversely to the length direction of said one shear arm.

In this way two gobs in the case of double mould operation, and three gobs in the case of triple mould operation, of molten glass can be severed from the associated streams substantially simultaneously. Correspondingly, a number of shear blade pairs are then arranged on the respective shear arms with a spacing equal to the spacing of the streams. Preferably, the crank performs a complete rotation through 360° in each working operation. The cutting stroke can be changed in a particularly simple manner simply by adjusting the effective crank radius. In order that the operation is not asynchronous, the crank is brought to a standstill after each working operation and is maintained in this stationary state during a minimum waiting period of for example 20 ms. For a given movement period of the shear arms during one working cycle of for example 250 ms, the length of the waiting period depends upon the cutting speed, i.e. on the number of shearing cuts per minute. The crank drive is designed as a non-linear transmission gear system and permits one to start the drive in a relatively lightly loaded manner. Thus, its own acceleration is facilitated for the drive when starting up and the energy requirements are reduced. The use of the carriage brings the particular advantage that one keeps the working stroke of the shear arms to a minimum and thereby on the one hand reduces working energy and on the other hand can increase the maximum possible working speed. Also, the carriage makes it possible to have a very simple and rapid opening of the shear arms, even beyond the opened position relevant to the working stroke. This further opening is desirable for example if servicing or replacement of the drop ring of the feeder bowl has to be undertaken. The drop ring and its surroundings can then be made accessible for the purpose of servicing in a very rapid and simple way. The further opening of the shear arms into their servicing position can also take place automatically upon shutdown of the drive. For this purpose the control of the drive system generates a starting pulse for a further control for the return drive of the carriage. The shear arms then remain in their further opened security setting until the fault of the drive has been overcome. In this way the shear blades cannot collide with the glass streams.

In a preferred embodiment of the invention, the carriage is guided on guide rods of bracket means, and the bracket means is adjustable circumferentially of a feeder which supplies the glass stream or streams. According to this embodiment the bracket means and consequently the carriage and the drive for the shear arms can be adjusted easily and rapidly to the optimum angular position relative to the shear arms, and indeed in dependence upon space requirements in the circumferential direction either on the one or on the other side of the shear arms. Also, the shear arms themselves can be adjusted in a manner known per se in the circumferential direction relative to the feeder bowl, at least if one is talking about multiple shears which are designed to sever gobs from more than one stream. The rotational position of the glass streams must be able to be adjusted to the glass forming machine which receives the glass gobs. The circumferential setting both of the shears and also of the bracket means with the drive is preferably effected by fixing these elements with hammer bolts in circumferential T-grooves of the feeder bowl. Preferably, two such T-grooves are arranged axially spaced from one another on the feeder bowl, so that one obtains a sufficiently rigid fastening of the shears and of the drive to the feeder bowl.

Preferably, the carriage is displaceable by at least one piston-cylinder unit which is supported on the one hand on the carriage and on the other hand is rigid with the apparatus. The piston-cylinder units are preferably double-acting units so that the carriage can be displaced in both directions by the driving force.

According to a preferred embodiment, the movement of the carriage in the direction of the shear arms for adjusting the overlap of the shear blades is limited by at least one stop element which is adjustable and is mounted to be rigid with the apparatus. Thus, the overlap of the shear blades can be adjusted in a particularly simple manner and very accurately. The overlap, i.e. the mutual overlapping of the shear blades of each paid of shear blades, should be kept as small as possible. The gobs should be separated cleanly from the stream. As soon as the shear is made, the shear blades should not unnecessarily overlap each other any further but should perform their return movement into the open position.

Preferably, the coupling rod is connected at its two ends to respective universal joints. This facilitates the height adjustment of the shears relative to the outlet of the orifice ring which permits the streams of molten glass to exit from the feeder bowl.

Preferably, the drive means comprises an electric servo-motor. This gives a particularly advantageous drive mechanism. In particular, one can use a three-phase servo-motor with feedback as the servo-motor, the control of which is freely programmable in respect of the speed-rotary angle-path. Thus, by pre-programming, the shear arms can in any angular position be provided with the optimum speed values, and indeed, if need be, with different speed values for the closing and opening movements of the shear arms. By the inventive use of an electric servo-motor, the overall cycle duration which, as mentioned above, can amount to 250 ms, can be reproduced in practice with an accuracy of for example approximately 1 ms.

The drive means preferably comprises a gear mechanism connected between the servo-motor and the crank. In this way one then has more freedom of choice in the layout of the speed of the servo-motor.

Preferably, a pneumatic piston-cylinder unit is connected on the one hand to the other of the shear arms and on the other hand to a bearing which is rigid with the apparatus. With such a piston-cylinder unit one is talking in effect about an air spring. The gear mechanism for synchronizing the shear arms preferably consists of toothed segments which mesh with each other and which are provided coaxially in relation to spaced pivot shafts of the shear arms. The air spring keeps the teeth of the toothed segments permanently in contact with each other as much as possible. In this way one is careful with the toothed segments, the drive means is freed from avoidable load and the positioning of the shear blades is improved.

SUMMARY OF THE INVENTION

Apparatus for the severing of gobs from one or more streams of molten glass, in which the separation of each gob is effected by a shear blade pair, and in which the shear blades of each shear blade pair are arranged on respective associated, pivotally mounted shear arms. The pivotal movement of the two shear arms is synchronized by means of a gear mechanism with the pivotal movements being produced by the driving of one of the shear arms by a drive means including a crank having an eccentric crank pin. A coupling rod is coupled on the one hand to the crank pin and on the other hand to said one shear arm. The drive means is arranged on a carriage and the carriage is displaceable substantially transversely to the length direction of said one shear arm.

BRIEF DESCRIPTION OF THE DRAWINGS

In order that the invention may be more fully understood, one presently preferred embodiment of apparatus in accordance with the invention will now be described by way of example and with reference to the accompanying drawings, in which.

DETAILED DESCRIPTION OF THE INVENTION

Figure 1:
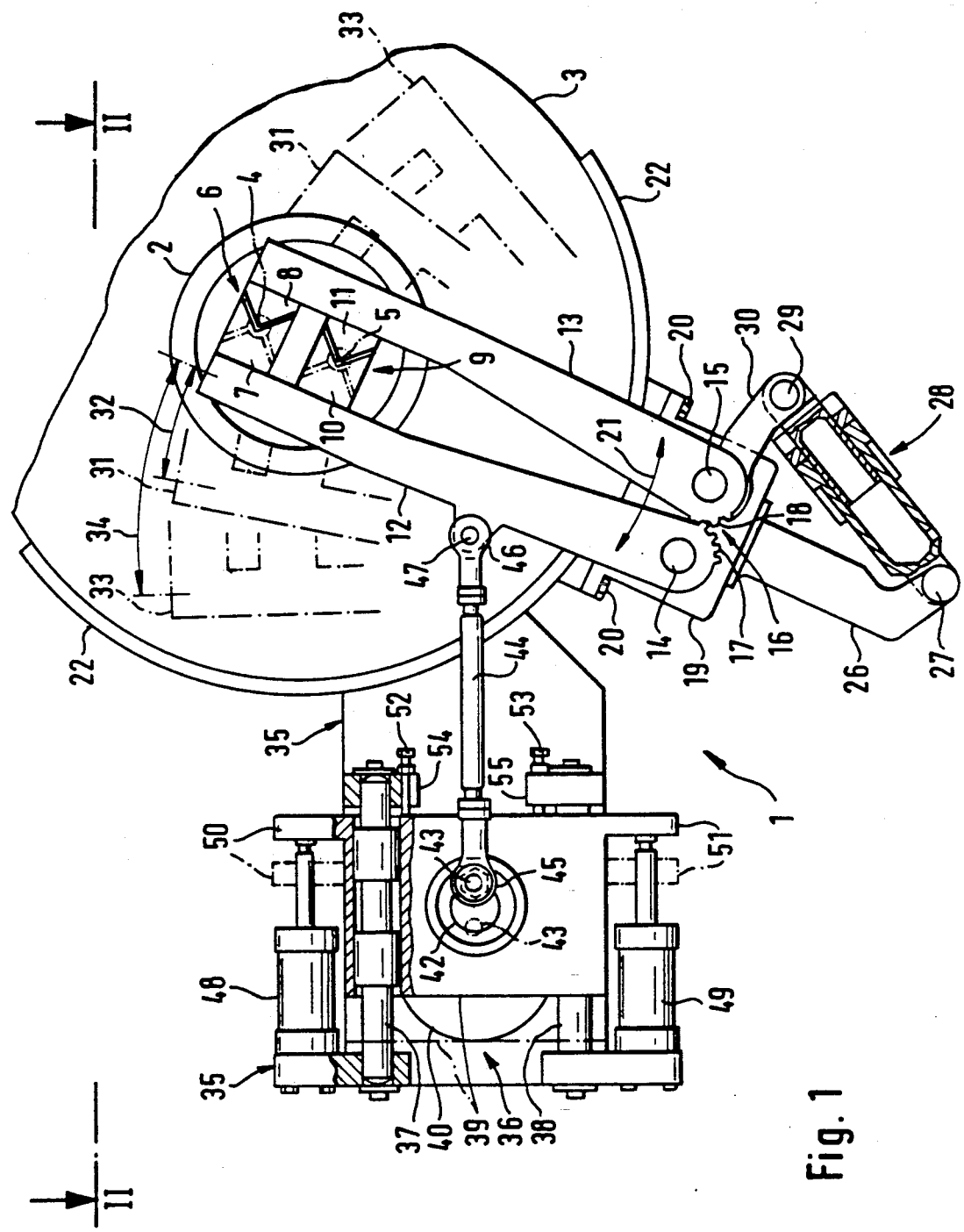
FIG. 1 is a view, partly in section, of the severing apparatus, seen from below.

FIG. 1 shows an apparatus 1 for the severing of gobs from two streams of molten glass (not shown). The streams are generated perpendicular to the plane of the drawing from an orifice ring 2 at the lower end of a feeder bowl 3. Reference to the feeder bowl 3 is intended to mean the end-piece of a feeder or supply mechanism which is known per se for molten glass. The longitudinal axes of the two streams of molten glass are indicated at 4 and 5 in FIG. 1.

A shear blade pair 6, with shear blades 7 and 8, periodically separates gobs of molten glass from the stream which has the longitudinal axis 4. The gobs are supplied in a manner known per se to a glass forming machine for the manufacture of hollow glass objects. In a similar manner, a shear blade pair 9 having shear blades 10 and 11 periodically separates glass gobs from the stream which has the longitudinal axis 5. Each shear blade 7, 8 and 10, 11 is provided at its free end with a V-shaped cutting edge.

The shear blades 7, 10 are secured to a first shear arm 12 with a spacing equal to the spacing of the longitudinal axes 4, 5 while the shear blades 8, 11 are secured at the same spacing from each other on a second shear arm 13. The shear arms 12, 13 are pivotally mounted on pins 14 and 15, and the pivotal movements of the shear arms 12, 13 are synchronized with each other by means of a gear mechanism 16. The gear mechanism 16 consists in this case of toothed segments 17 and 18 on the shear arms 12, 13 which mesh with each other. The pins 14, 15 are secured with a lateral spacing from each other on a holder 19. The holder 19 is secured by four hammer bolts 20 on two setting rails 22 and 23 (FIG. 2) which are axially spaced from each other, so that the holder is adjustable in the circumferential direction 21. The heads (not shown) of the hammer bolts engage in T-grooves 24 and 25 of the setting rails 22, 23.

From the holder 19 an extension 26 extends outwardly having a bearing 27 which is rigid with the apparatus and at which is connected one end of a pneumatic piston-cylinder unit 28 which is formed as an air spring. The unit 28 is mounted with its other end on a bearing 29 of a lateral lever 30 of the second shear arm 13.

In FIG. 1 the shear arms 12, 13 are shown in solid lines in their closed positions with optimum overlap of the shear blades 7, 8 and 10, 11. In chain-dotted lines there is shown on the one hand the opened working position 31 with a working stroke 32 of the shear arm 12, and on the other hand an opened servicing position 33 with a comparatively large servicing stroke 34 for the shear arm 12. Normally, the apparatus 1 operates with the working stroke 32 for the shear arms 12, 13, which can be kept to a minimum. In this way working energy and wear is reduced to a minimum. If servicing work should have to be carried out on the orifice ring 2, then the shear arms 12, 13 are moved into the opened servicing position 33 in a manner which will be described hereinafter. This gives a sufficient arc of free space for the service personnel to gain access to the orifice ring and facilitates its repair or exchange.

On the setting rails 22, 23 of the feeder bowl 3 is mounted a bracket 35 which is spaced from the holder 19 and which is secured by hammer bolts (not shown) so that it is adjustable in the circumferential direction 21. The circumferential adjustment is so chosen that an optimum angular position of a drive 36 relative to the shear arms 12, 13 results. The bracket 35 can be arranged on the one side of the holder 19 or on the other side of the holder depending upon available space.

On the bracket 35 are secured guide rods 37 and 38 which are laterally spaced from each other and on which a carriage 39 is displaceable transversely to a longitudinal direction of the shear arm 12. The carriage 39 carries the drive 36. The drive 36 comprises an electric servo-motor 40 with gearing 41 (FIG. 2) at its output side. By appropriate design of the servo-motor 40 one can omit the gearing 41. In any case, by means of the servo-motor 40, a crank 42 with a crank pin 43 is driven. A length-adjustable coupling rod 44 is connected by means of universal joints 45 and 46 on the one hand to the crank pin 43 and on the other hand to a pin 47 of the shear arm 12.

When, as shown in FIG. 1, the crank pin 43 has been advanced through 180° into the chain-dotted line position, the shear arms 12, 13 have moved into the opened working position 31. The shear arms 12, 13, as mentioned above, are held in that position during a more or less long waiting period, until the drive 36 receives a starting pulse for a new working cycle from its program control (not shown).

If on the other hand the shear arms 12, 13 are to be moved into their opened servicing position 33, then double-acting pneumatic piston-cylinder units 48 and 49 are actuated. The units 48, 49 are supported on the one hand on extensions 50 and 51 of the carriage 39 and on the other hand on the bracket 35. The powering of the units 48, 49 leads to the carriage 39, together with the drive 36, being displaced to the left as shown in FIG. 1 into the end position indicated by the chain-dotted lines.

If faults should occur in the drive 36 or in its program control, or, as in the case of loss of power, are noticed, then the program control can bring the drive 36 to a stop and send a starting signal to another control for the units 48, 49 so that automatic displacement of the carriage 39 for the further opening of the shear arms 12, 13 is effected. Thus, in all cases a collision between the shear arms 12, 13 and the glass streams is prevented.

By powering the other piston side of the units 48 and 49, the carriage 39 can be displaced back into its working position as shown in FIG. 1 by solid lines. In this working position the carriage 39 is in contact with two stop elements 52 and 53 which are formed as setting screws. The stop elements 52, 53 are each screwed into an extension 54 and 55 respectively of the bracket 35 and define the overlap of the shear blade pairs 6 and 9.

Figure 2:
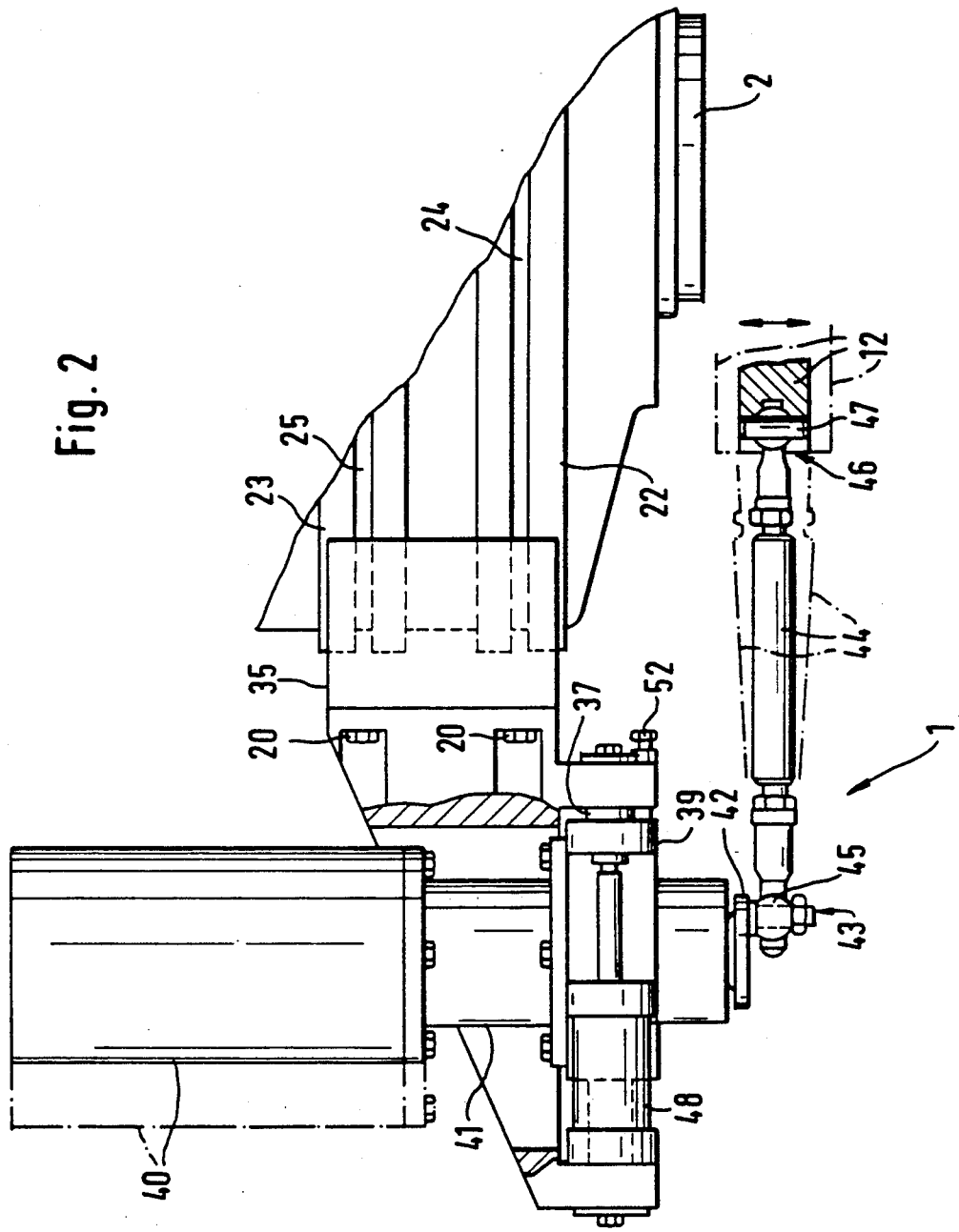
FIG. 2 shows a side view of part of the apparatus, partly in section, and taken along the line II—II in FIG. 1.

FIG. 2 shows further details of the apparatus 1. In particular, by chain-dotted lines it is indicated that the shear arm 12 and, in a corresponding, not shown manner, the shear arm 13 also, can be adjusted relative to the orifice ring 2 in the direction perpendicular thereto. The limit positions of the shear arm 12 are indicated by chain dotted lines. Correspondingly, the length-adjustable coupling rod 44 will be angularly displaced relative to the horizontal. The length adaptation for such angular adjustment can be effected by length adjustment of the coupling rod 44. The universal joints 45 and 46 make this height adjustment of the shear arm 12 easily possible.

The shear arms 12, 13 are in accordance with the invention thus driven directly during the whole working cycle. By program control of the electric servo-motor 40 one can drive the shear blade pairs 6, 9 with any desired suitable velocity profile. Also, an increase and reduction in the number of cuts per minute can be accomplished in a simple manner by changing the programming of the control even during the shearing operation itself. Preferably, the crank pin 43 always moves in the same direction of rotation. By means of this shear drive one can accomplish the highest cutting speeds per minute required for today's glass forming machines without problems and reproducible within the most narrow limits.

What is claimed is:

1. Apparatus for severing gobs from one or more streams of molten glass comprising:
    at least one pair of shear blades for severing each gob of molten glass;

a pair of pivotally mounted elongated shear arms, the individual shear blades of each shear blade pair being mounted on separate ones of said shear arms;

means for pivoting said shear arms, pivotal movement being produced by drive means actuating one of the shear arms, said means for pivoting said shear arms including a crank driven by said drive means, an eccentric crank pin on said crank, a coupling rod coupled to the crank pin and to said one shear arm, and gear means for synchronizing the pivotal movements of said shear arms; and a carriage for supporting said drive means, and means for displacing said carriage in a direction substantially transverse to the length direction of said one shear arm for adjusting the overlap of the shear blades of each pair.

2. Apparatus according to claim 1, in which bracket means having guide rods is provided for guiding the displacement of said carriage, and the bracket means is supportable by and adjustable circumferentially of a feeder bowl which is arranged to supply the glass stream or streams.

3. Apparatus according to claim 1, in which said means for displacing the carriage comprises at least one piston-cylinder unit which is supported on the carriage and on a stationary frame portion of the apparatus.

4. Apparatus according to claim 1, in which displacement of the carriage towards the shear arms for adjustment of the overlap of the shear blades is limited by at least one stop element which is adjustable and which is mounted on a stationary frame portion of the apparatus.

5. Apparatus according to claim 1, in which the coupling rod is connected to the crank pin and to the one shear arm at its two ends respectively by universal joints.

6. Apparatus according to claim 1, in which the drive means comprises an electric servo-motor.

7. Apparatus according to claim 6, in which the drive means comprises a gear mechanism connected between the servo-motor and the crank.

8. Apparatus according to claim 1, in which a pneumatic piston-cylinder unit is connected to the other of the shear arms and to a bearing which is stationary with respect to the shear arms for maintaining the gear means in driving contact for synchronizing the pivotal movements of the shear arms.

* * * * *